United States Patent
Yu

(10) Patent No.: US 9,229,473 B2
(45) Date of Patent: Jan. 5, 2016

(54) PORTABLE KEYBOARD

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Wen-Hua Yu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 274 days.

(21) Appl. No.: 13/773,678

(22) Filed: Feb. 22, 2013

(65) Prior Publication Data

US 2013/0222990 A1 Aug. 29, 2013

(30) Foreign Application Priority Data

Feb. 24, 2012 (CN) .......................... 2012 1 0043042

(51) Int. Cl.
*G06F 1/16* (2006.01)
*G06F 3/02* (2006.01)

(52) U.S. Cl.
CPC ................ *G06F 1/16* (2013.01); *G06F 3/0202* (2013.01); *G06F 3/0221* (2013.01)

(58) Field of Classification Search
CPC ... G06F 1/1664; G06F 1/1666; G06F 1/1624; G06F 1/1662; G06F 1/1667; G06F 1/1669; G06F 1/1671
USPC ............. 361/679.01, 679.02, 679.08, 679.09, 361/679.11–679.21, 679.26–679.29, 361/674.9–679.45, 679.57–679.59; 292/1–62, 113, 169.11–169.23, 292/341.11–341.19; 400/682, 82, 691–692, 400/693, 488, 489; 341/22; 345/168; 364/708.1

See application file for complete search history.

(56) References Cited

U.S. PATENT DOCUMENTS

| | | | | |
|---|---|---|---|---|
| 5,841,635 A | * | 11/1998 | Sadler | H01H 13/84 200/5 A |
| 6,005,497 A | * | 12/1999 | Snyder | G06F 3/0221 200/506 |
| 6,195,839 B1 | * | 3/2001 | Patterson | G06F 3/0202 16/328 |
| 6,556,430 B2 | * | 4/2003 | Kuo et al. | 361/679.09 |
| 2003/0128502 A1 | * | 7/2003 | Chuang | 361/680 |
| 2004/0223296 A1 | * | 11/2004 | Hsu | 361/680 |
| 2009/0009944 A1 | * | 1/2009 | Yukawa et al. | 361/681 |
| 2009/0015995 A1 | * | 1/2009 | Lin | 361/680 |
| 2009/0096430 A1 | * | 4/2009 | Van Der Linde et al. | 320/166 |
| 2010/0265652 A1 | * | 10/2010 | Agata et al. | 361/679.41 |
| 2011/0073455 A1 | * | 3/2011 | Cheng | 200/5 A |

* cited by examiner

*Primary Examiner* — Michail V Datskovskiy
(74) *Attorney, Agent, or Firm* — Novak Druce Connolly Bove + Quigg LLP

(57) ABSTRACT

A folding portable keyboard includes a first keyboard section, a second keyboard section, and a folding structure. The first keyboard section and the second keyboard section are coplanar with each other when the portable keyboard is unfolded, or overlap each other when the portable keyboard is folded. The folding structure includes a rotary assembly having a first sleeve, a second sleeve, and a pivot. The first sleeve is defined on a first sidewall of the first keyboard section. The second sleeve is defined on a second sidewall of the second keyboard section. The pivot is sleeved by the first sleeve and the second sleeve. The first sleeve and the second sleeve are capable of rotating relative to each other about the pivot until the first keyboard section overlaps the second keyboard section.

17 Claims, 12 Drawing Sheets

PORTABLE KEYBOARD

BACKGROUND

1. Technical Field

The disclosure relates to keyboards and, particularly, to a portable keyboard for an electronic device.

2. Description of Related Art

Keyboards are important input/output (I/O) devices of computing devices, such as desktop computers. However, most keyboards are rigid structures that are packed with as many keys as possible and this makes keyboards have large dimensions. Thus, keyboards take up a lot of real estate on shelves and display counters and are also inconvenient to transport. Therefore, there is room for improvement in the art.

BRIEF DESCRIPTION OF THE DRAWINGS

The accompanying drawings are included to provide a further understanding of the disclosure, and are incorporated in and constitute a part of this application. The drawings illustrate embodiments of the disclosure and, together with the description, serve to explain the principles of the disclosure.

DETAILED DESCRIPTION

Figure 1:
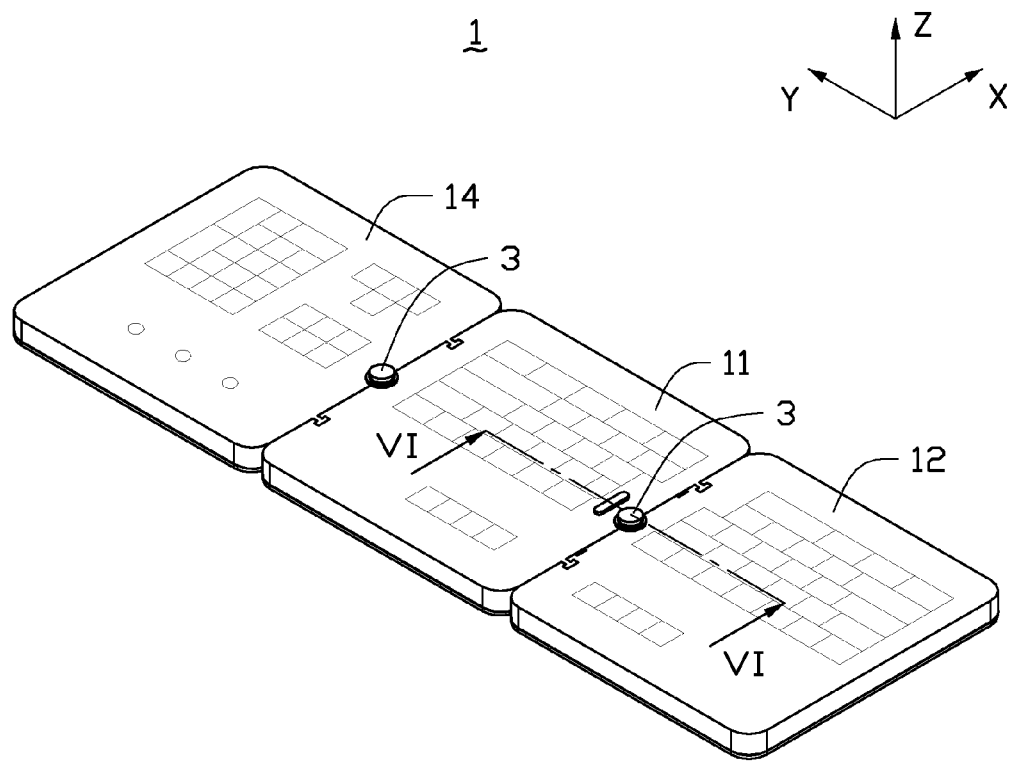
FIG. 1 is a schematic view of a portable keyboard in an unfolded state.

Examples of the present embodiments are illustrated in the accompanying drawings. Wherever possible, the same or similar reference numbers are used, in the drawings and the description, to refer to the same or like parts.

FIG. 1 is a schematic view of a portable keyboard 1 in an unfolded state. The portable keyboard 1 includes a first keyboard section 11, a second keyboard section 12, a third keyboard section 14, and two folding structures 3. One of the folding structures 3 is connected between the first keyboard section 11 and the second keyboard section 12 to interconnect the first keyboard section 11 and the second keyboard section 12. The other one of the folding structures 3 is connected between the first keyboard section 11 and the third keyboard section 14 to interconnect the first keyboard section 11 and the third keyboard section 14. Each of the first, second, and third keyboard sections 11, 12, 14 includes at least one embedded control circuit (not shown) and a plurality of keys electrically connected to the control circuit for data input. The embedded control circuit of each of the first, second, and third keyboard sections 11, 12, 14 can be electrically interconnected with each other for signal transmission. In other embodiments, the portable keyboard 1 can include only two of the first, second, and third keyboard sections 11, 12, 14. For example, the third keyboard section 14 and one of the folding structures 3 between the first and third keyboard sections 11, 14 can be omitted.

Figure 12:
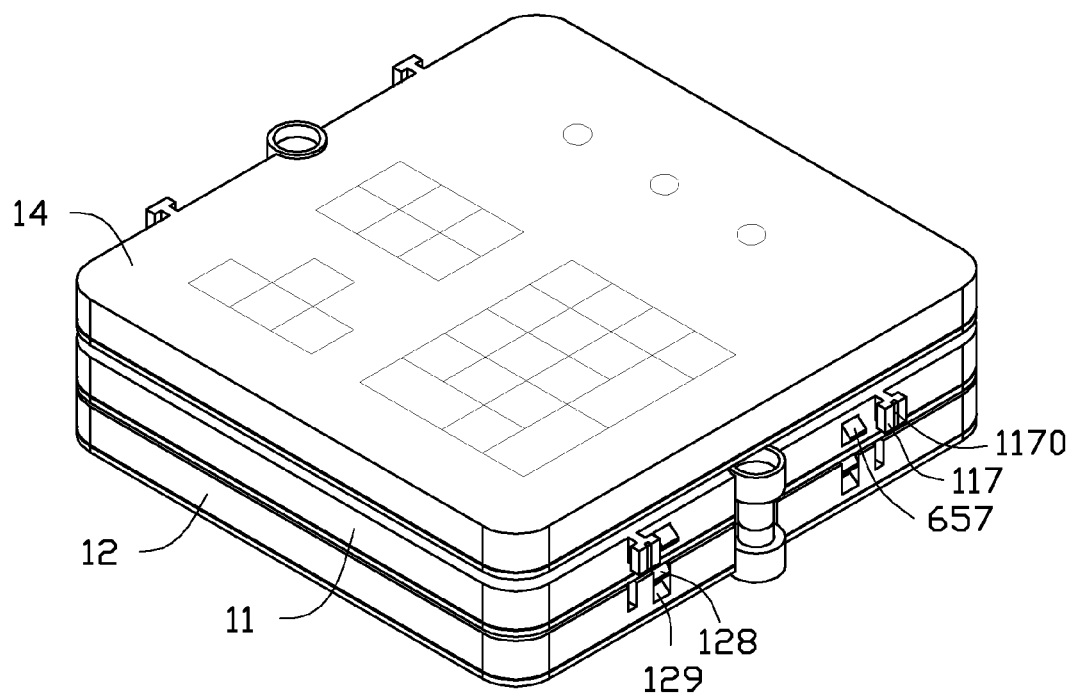
FIG. 12 shows a schematic view of the portable keyboard when the portable keyboard is in a folded state.

The folding structure 3 that interconnects the first keyboard section 11 and the second keyboard section 12 is arranged between two adjacent sidewalls of the first keyboard section 11 and the second keyboard section 12. In this embodiment, the second keyboard section 12 is capable of rotating relative to the first keyboard section 11 about the folding structure 3, to overlap the first keyboard section 11. The other folding structure 3 that interconnects the first keyboard section 11 and the third keyboard section 14 is arranged between two adjacent sidewalls of the first keyboard section 11 and the third keyboard section 14. In this embodiment, the third keyboard section 14 is capable of rotating relative to the first keyboard section 11 about the other folding structure 3 to overlap the first keyboard section 11. When the second keyboard section 12 and the third keyboard section 14 are rotated to overlap the first keyboard section 11, the portable keyboard 1 is defined to be in a folding state as shown in FIG. 12. In this state, the first keyboard section 11 is sandwiched between the second keyboard section 12 and the third keyboard section 14. In other words, the second keyboard section 12 is positioned under the first keyboard section 11, and the third keyboard section 14 is positioned over the first keyboard section 11. In one embodiment, when the portable keyboard 1 is in the folded state, the third keyboard section 14 can be connected to an external power supply and can be independently used to execute some corresponding functions, such as function as a numerical keyboard for inputting numbers. When the portable keyboard 1 is opened to the unfolded state, the first, second, and third keyboard sections 11, 12, 14 are coplanar with each other as shown in FIG. 1.

Figure 2:
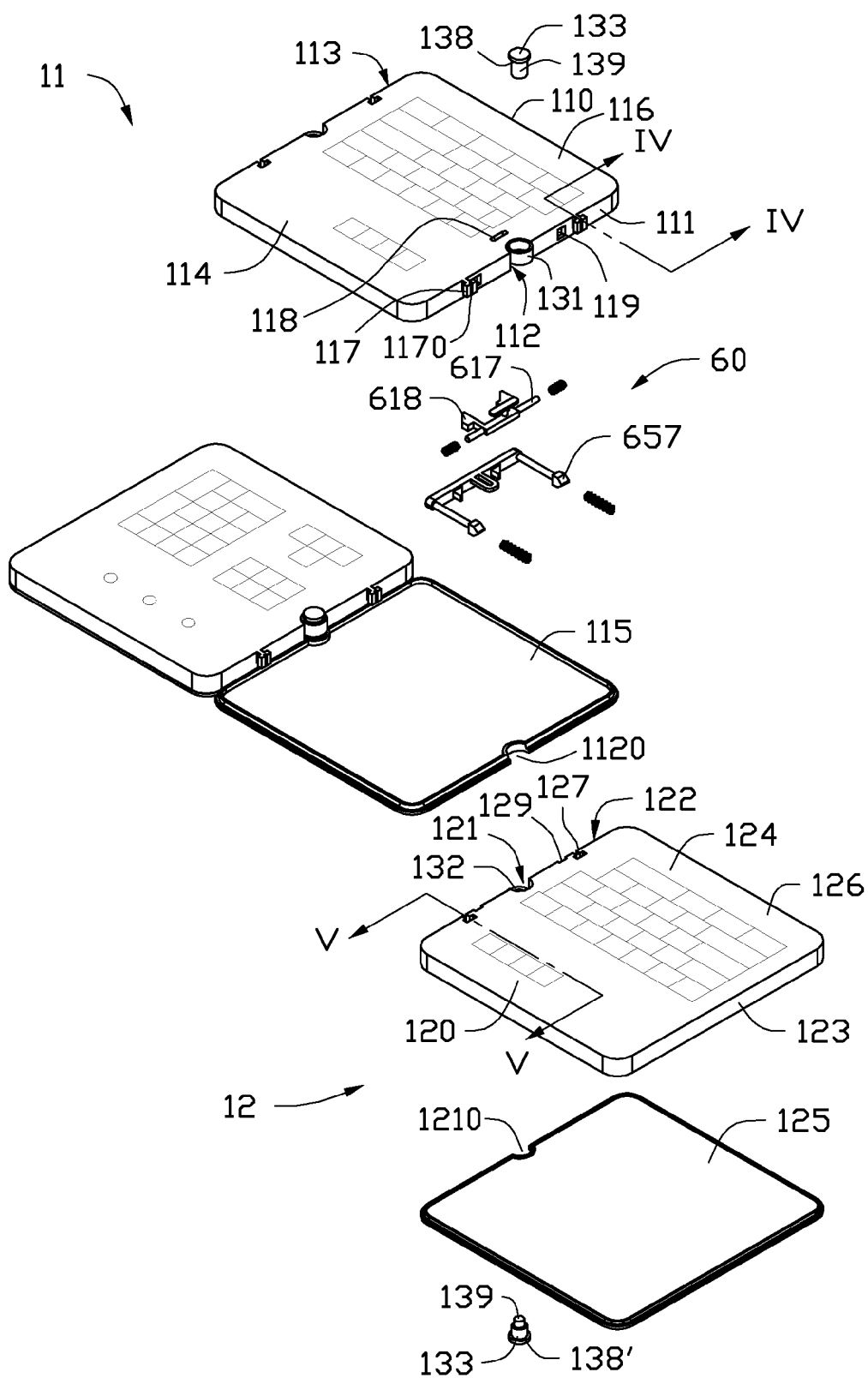
FIG. 2 is a partial exploded view of the portable keyboard of FIG. 1.
Figure 3:
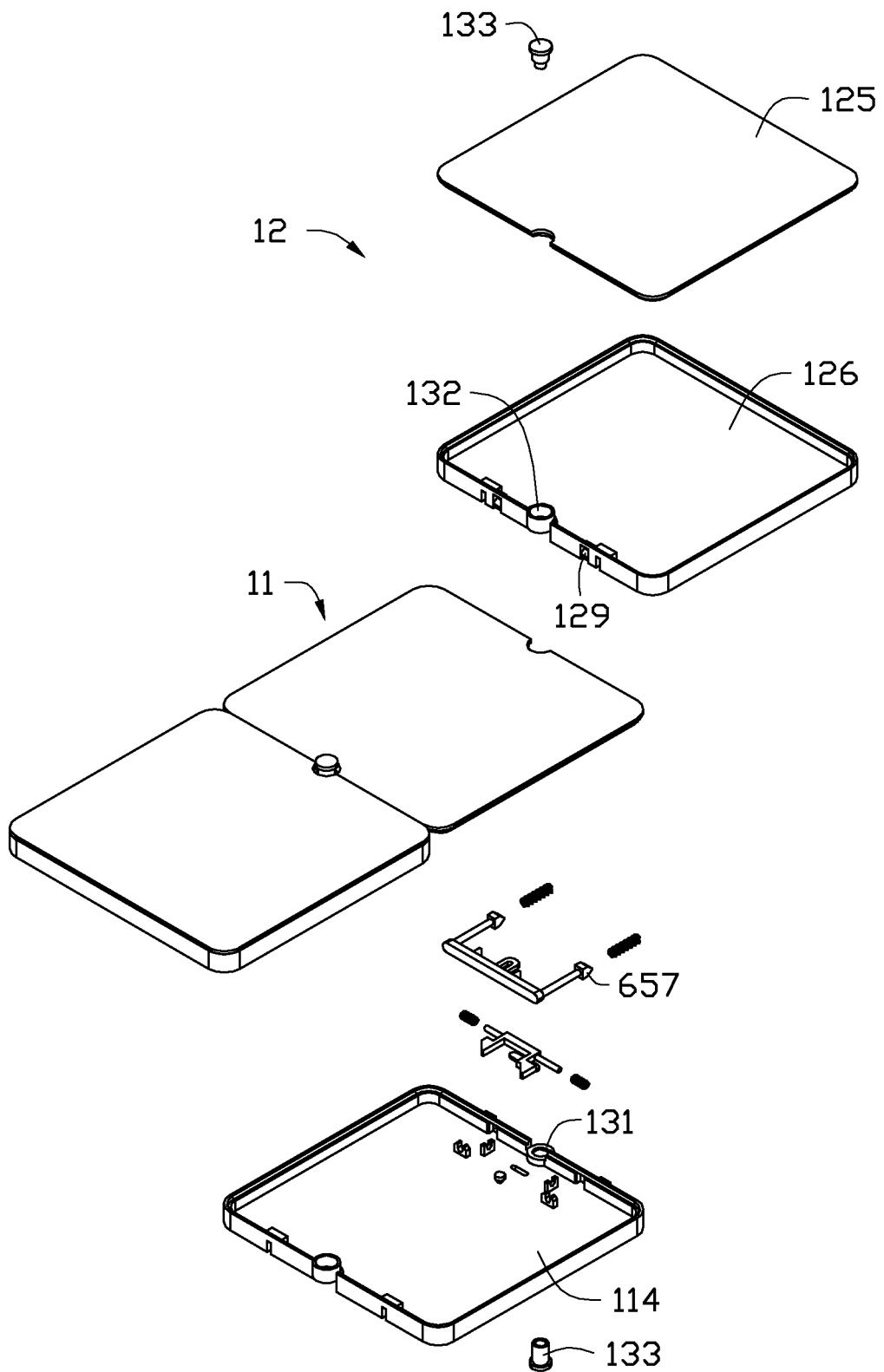
FIG. 3 is similar to FIG. 2 but viewed from an opposite direction.
Figure 4:
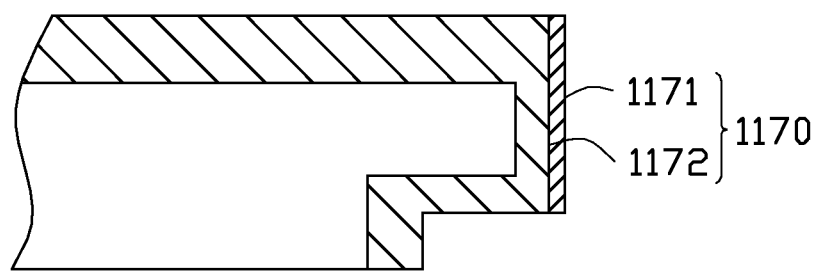
FIG. 4 is a cross-sectional view of a first shell of FIG. 2 along a direction of IV-IV line.

FIG. 2 is a partial exploded view of the portable keyboard 1 of FIG. 1, FIG. 3 is a partial exploded view of the portable keyboard 1 of FIG. 1 viewed from an opposite direction, FIG. 4 is a cross-sectional view of a first shell of FIG. 2 along a direction of IV-IV line. In this embodiment, FIGS. 2-4 only show the exploded views of the first keyboard section 11, the second keyboard sections 12, and one folding structure 3 between the first keyboard section 11 and the second keyboard section 12. The same or similar structures could be included among the first keyboard section 11, the third keyboard section 14, and another folding structure 3 between the first keyboard section 11 and the third keyboard section 14.

The first keyboard section 11 includes a first shell 110. The first shell 110 includes a first base 115 and a first cover 116. The first base 115 is coupled to the first cover 116 to define a space for receiving the control circuit (not shown) of the first keyboard section 11 therebetween. The first cover 116 includes two opposite sidewalls 111, 113, and a top surface 114 connected between the two sidewalls 111, 113. The keys of the first keyboard section 11 protrude out from the top surface 114, to facilitate operation of a user. The sidewall 111 defines a first notch 112 configured for receiving the folding structure 3. The sidewall 111 further defines an opening 119 and at least one first latch member 117. The at least one first latch member 117 may be a T-shaped protrusion, for example. A connector 1170 is defined at an end of the at least one first latch member 117 facing the second keyboard section 12. As shown in FIG. 4, the connector 1170 includes a first connection surface 1171 protruding out from the first shell 110 to connect the second keyboard section 12, and a second connection surface 1172 electrically connected to the control circuit embedded in the first shell 110 for data transmission.

The top surface 114 defines a through hole 118. Partial components of the corresponding folding structure 3 can be seen through the opening 119. The base 115 further defines a first receiving groove 1120 corresponding to the first notch 112.

The second keyboard section 12 includes a second shell 120. The second shell 120 includes a second base 125 and a second cover 126. The second base 125 is coupled to the second cover 126 to define a space for receiving the control circuit (not shown) of the second keyboard section 12 therebetween. The second cover 126 includes two opposite sidewalls 122, 123, and a top surface 124 connected between the two sidewalls 122, 123. The keys of the second keyboard section 12 protrude out from the top surface 124, to facilitate operation of the user. The sidewall 122 defines a second notch 121 corresponding to the first notch 112 to receive the folding structure 3. The sidewall 122 further defines at least one second latch member 127. The at least one second latch member 127 may be a T-shaped recess corresponding to the at least one first latch member 117.

Figure 5:
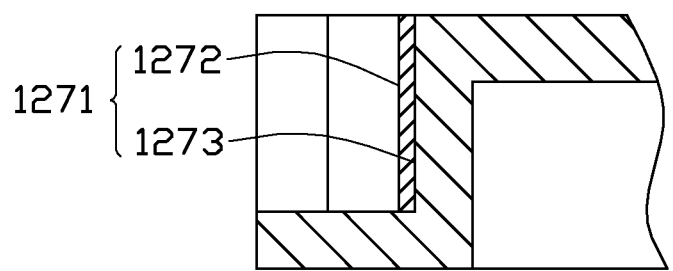
FIG. 5 is a cross-sectional view of a second shell 120 along a direction of V-V line of FIG. 2.

FIG. 5 is a cross-sectional view of the second shell 120 along a direction of V-V line of FIG. 2. The at least one second latch member 127 defines an electrical connection member 1271 corresponding to the connector 1170 of the first keyboard section 11. The electrical connection member 1271 passes through the second shell 120 and is embedded in the at least one second latch member 127. The electrical connection member 1271 includes a third connection surface 1272 and a fourth connection surface 1273. The fourth connection surface 1273 is electrically connected to the control circuit (not shown) embedded in the second shell 120 for data transmission. When at least one second latch member 127 latches with the at least one first latch member 117, the third connection surface 1272 contacts with the first connection surface 1171, thereby establishing an electrical connection between the first keyboard section 11 and the second keyboard section 12.

The sidewall 122 further defines a fixing portion 129 to fix the folding structure 3. The fixing portion 129 may be a concave hole. An oblique guide surface 128 as shown in FIG. 12 is formed between the fixing portion 129 and the top surface 124. The guide surface 128 cooperates with the fixing portion 129 to fix the folding structure 3. The second base 125 defines a second receiving groove 1210 corresponding to the second notch 121.

The folding structure 3 includes a rotary assembly 13 and an urging structure 60. The urging structure 60 fixes the first keyboard section 11 to the second keyboard section 12 when the first keyboard section 11 is coplanar with the second keyboard section 12. When the portable keyboard 1 is needed to be folded from the unfolded state, the urging structure 60 releases the connection between the second keyboard section 12 and the first keyboard section 11. When the portable keyboard 1 is in the unfolded state, an external object, such as a desk, can also support it. In this regard, the urging structure 60 can be omitted.

In the embodiment, the rotary assembly 13 includes a first sleeve 131, a second sleeve 132, and a pivot 133. The first sleeve 131 is received in and fixed to the first notch 112. The second sleeve 132 is received in and fixed to the second notch 121. When the first keyboard section 11 is assembled to the second keyboard section 12, the first sleeve 131 aligns with the second sleeve 132. The pivot 133 is sleeved by the first sleeve 131 and the second sleeve 132, and is capable of moving within the first sleeve 131 and the second sleeve 132. The second sleeve 132 is capable of moving along the pivot 133.

Figure 6:
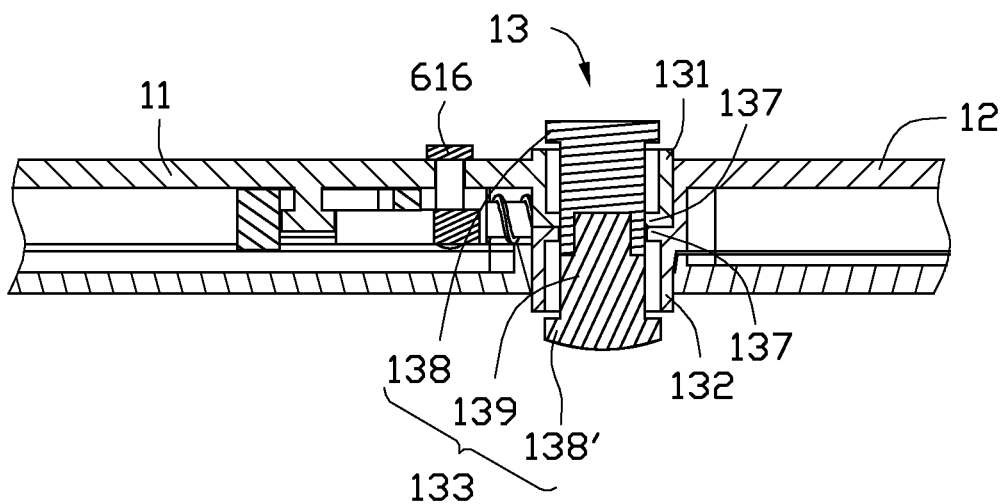
FIG. 6 is a cross-sectional view along a direction of VI-VI line of FIG. 1.
Figure 9:
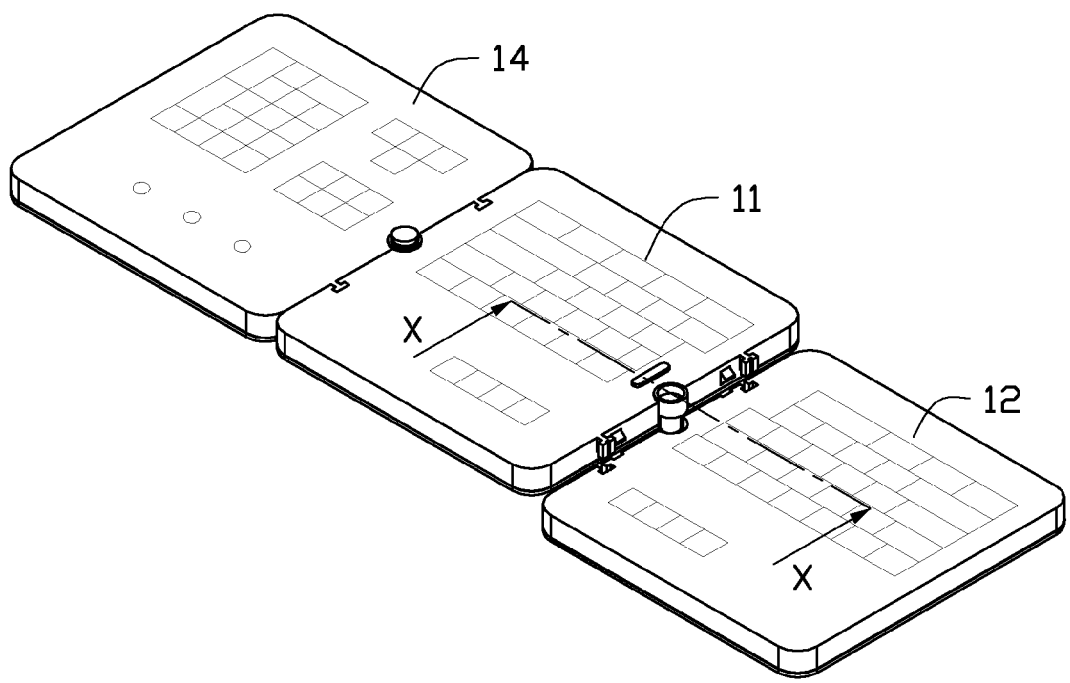
FIG. 9 shows a schematic view of a process of folding the portable keyboard.
Figure 10:
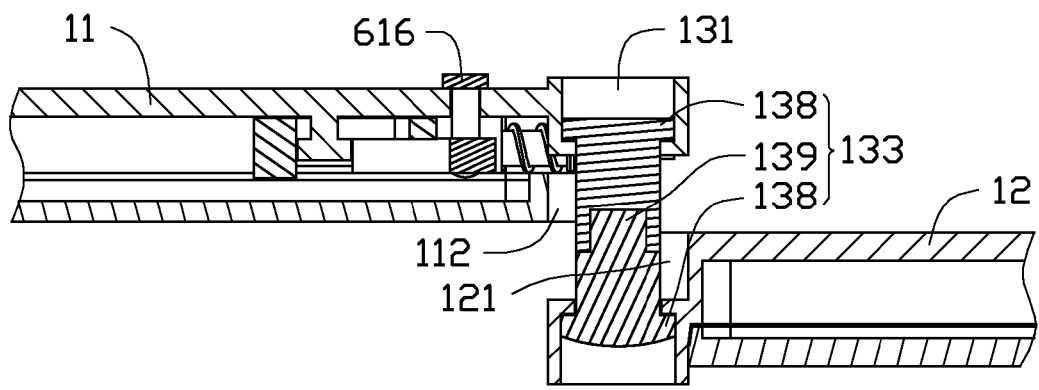
FIG. 10 is a cross-sectional view of FIG. 9 along a direction of X-X line.

FIG. 6 shows the pivot 133 including a body 139, and a first resisting member 138 and a second resisting member 138' defined at two opposite ends of the body 139. Two limiting members 137 are correspondingly defined on the first sleeve 131 and the second sleeve 132, which are configured for limiting the position of the first resisting member 138 and the second resisting member 138', thereby preventing the pivot 133 from moving out of the first sleeve 131 and the second sleeve 132. When the portable keyboard 1 needs to be folded, the pivot 133 moves down within the first sleeve 131 and the second sleeve 132 until the first resisting member 138 resists the limiting member 137 of the first sleeve 131. At the same time, as shown in FIG. 10, the second sleeve 132 moves along the body 139 of the pivot 133 until the second resisting member 138' resists the limiting member 137 of the second sleeve 132. Under this condition, the second keyboard section 12 can move down relative to the first keyboard section 11 along a lengthwise direction of the body 139 as shown in FIG. 9 and FIG. 10. When the second keyboard section 12 moves to a position that the top surface 124 is spaced from a bottom surface of the first base 115, the second keyboard section 12 is capable of rotating about the pivot 133 in a horizontal plane parallel to the top surface 124 to overlap the first keyboard section 11, so as to fold the portable keyboard 1.

In the embodiment, as shown in FIG. 6, the first resisting member 138 and the second resisting member 138' are protrusions like screw heads formed at two opposite ends of the body 139. In this embodiment, both the first resisting member 138 and the second resisting member 138' have a diameter that is greater than a diameter of the body 139. The two limiting members 137 are resisting walls correspondingly extending from an inner wall of the first sleeve 131 and an inner wall of the second sleeve 132.

Figure 7:
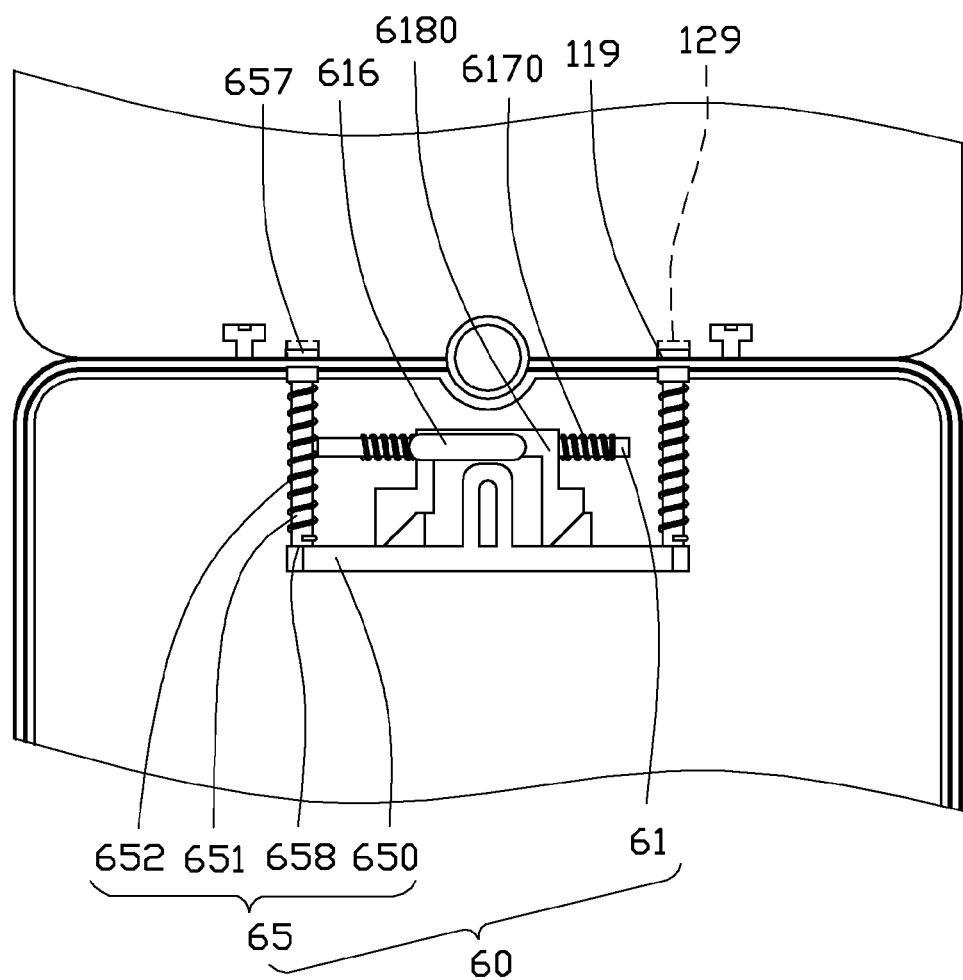
FIG. 7 and FIG. 8 show operation principles of an urging structure.
Figure 8:
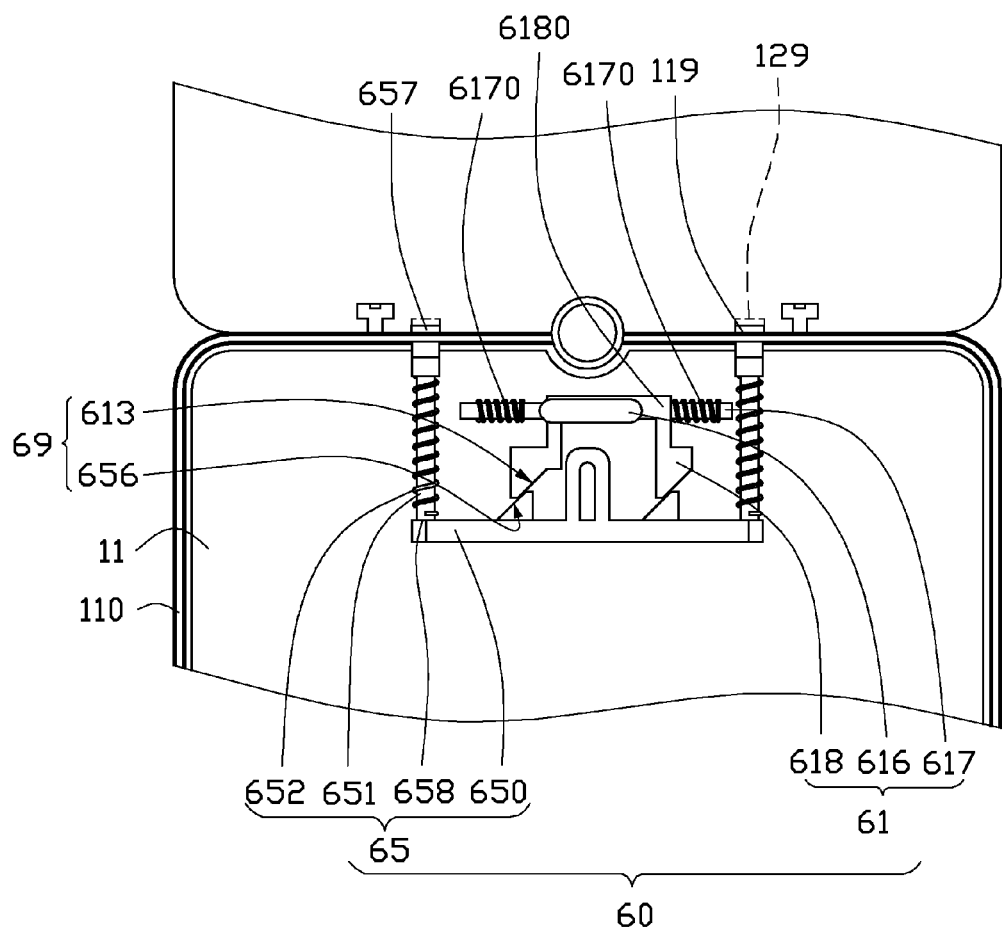

FIG. 7 and FIG. 8 show that the urging structure 60 is received in the first keyboard section 11. The urging structure 60 includes a resisting portion 65 and a driving portion 61. The resisting portion 65 is fixed to the first shell 110, and includes a first rod 650, at least one second rod 651 perpendicular to the first rod 650, and at least one spring 652. The at least one second rod 651 has a first terminal 657 and a second terminal 658 opposite to the first terminal 657. The second terminal 658 is perpendicularly connected to one end of the first rod 650. The at least one spring 652 is sleeved on the at least one second rod 651 between the first terminal 657 and the second terminal 658. The driving portion 61 drives the first terminal 657 to move into/out of the first shell 110 through the opening 119. When the first terminal 657 of the at least one second rod 651 is driven to move out of the first shell 110, the first terminal 657 is latched with the fixing portion 129 of the second keyboard section 12, thereby fixing the first keyboard section 11 to the second keyboard section 12. In one embodiment, the first terminal 657 may be triangular prism shaped. The fixing portion 129 of the second keyboard section 12 may be a triangular prism shaped groove for receiving the first terminal 657. The guide surface 128 guides the first terminal 657 to be received in the fixing portion 129.

The driving portion 61 includes a drive button 616, a slide rod 617, and a pushing element 618. The drive button 616 protrudes out from the first shell 110 through the through hole 118. The drive button 616 connects to the pushing element 618, and is capable of being forced to move along the through hole 118. The pushing element 618 has a hollow portion 6180 to sleeve on the slide rod 617. The pushing element 618 is driven by the drive button 616. A resilient member 6170 is sleeved on the slide rod 617 between an end of the pushing element 618 and an end of the slide rod 617. When an external force is applied to move the drive button 616, the drive button 616 drives the pushing element 618 to move along the slide rod 617 and press the resilient member 6170 to deform along the slide rode 617. When the external force applied to the drive button 616 is eliminated, the resilient member 6170 releases its deformation to drive the drive button 616 and the pushing element 618 to return to its original position.

In the embodiment, FIG. 8 shows that the pushing element 618 includes a first wedge-shaped portion 613. The resisting portion 65 further includes a second wedge-shaped portion 656 coupled to and in contact with the first wedge-shaped portion 613. The first wedge-shaped portion 613 and the second wedge-shaped portion 656 corporately define a forcing structure 69. When the drive button 616 is moved (e.g., along the right orientation) by the external force, the first wedge-shaped portion 613 pushes the second wedge-shaped portion 656 to move down, drawing the first terminal 657 of the at least one second rod 651 back into the first shell 110. Thus, the first terminal 657 is detached from the fixing portion 129. At this time, the at least one spring 652 is deformed. When the external force is eliminated, the at least one spring 652 releases its deformation and drives the first terminal 657 of the at least one second rod 651 to protrude out of the first shell 110 through the opening 119 again.

The assembled operation principle of the portable keyboard 1 is provided below.

As shown in FIG. 1 and FIG. 6, when the portable keyboard 1 is unfolded, the first sleeve 131 and the second sleeve 132 contact and align with each other. The first notch 112 couples to the second notch 121 to receive the first sleeve 131 and the second sleeve 132. The first terminal 657 of the at least one second rod 651 is latched into the fixing portion 129. At the same time, the at least one first latch member 117 is latched into the at least one second latch member 127, and the connector 1170 of the at least one first latch member 117 is electrically connected to the electrical connection member 1271 of the at least one second latch member 127. Thus, the first keyboard section 11 is electrically connected with the second keyboard section 12.

Figure 11:
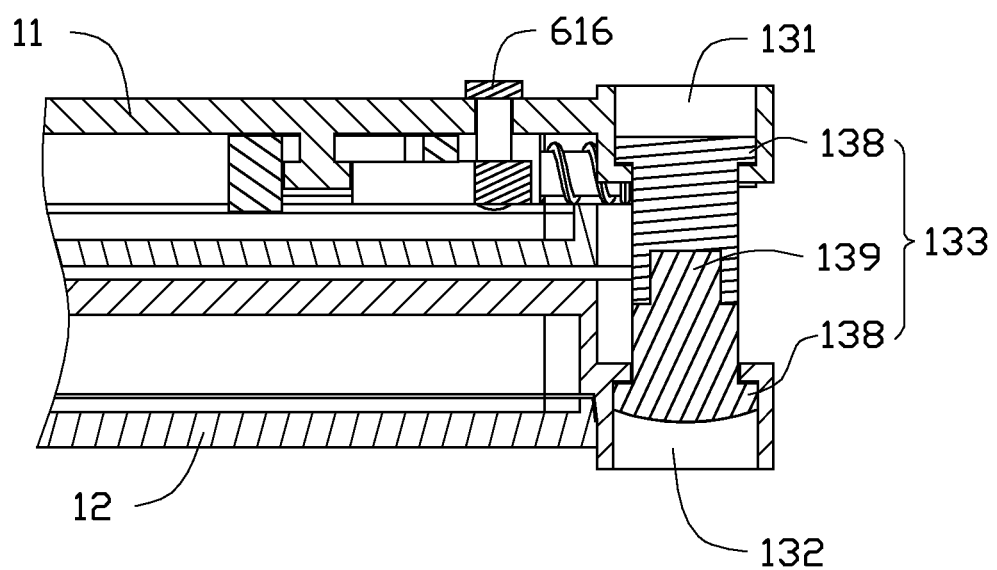
FIG. 11 is a cross-sectional view of FIG. 10 when a first keyboard section and a second keyboard section are overlapped with each other.

Referring to FIG. 8, when the portable keyboard 1 is needed to be folded, the drive button 616 is operated to force the driving portion 61 to push the resisting portion 65. Thus, the first terminal 657 is detached from the fixing portion 129 and is drawn back into the first shell 110 of the first keyboard section 11. Thereupon, the at least one first latch member 117 detaches from the at least one second latching member 127, and the second sleeve 132 slides downward along the pivot 133 to make the first keyboard section 11 and the second keyboard section 12 capable of rotating relative to each other about the pivot 133. Additionally, as shown in FIG. 11, the second keyboard section 12 is rotated about the pivot 133 until the first keyboard section 11 and the second keyboard section 11 overlap each other. Since the same structures are contained between the first keyboard section 11 and the third keyboard section 14, the assemble and operation principle between the first keyboard section 11 and the third keyboard section 14 are similar/the same as described above. When the first, second, and third keyboard sections 11, 12, 14 overlap each other, the portable keyboard 1 is in the folded state as shown in FIG. 12, to facilitate transportation.

In the embodiment, when the portable keyboard 1 is in the unfolded state, the surface of the first keyboard section 11 is coplanar with the surface of the second keyboard section 12. In this regard, a thickness of the first keyboard section 11 is identical to a thickness of the second keyboard section 12. A thickness of each of the first and second sleeves 131, 132 is less than the thickness of the first keyboard section 11 and the second keyboard section 12. Particularly, the thickness of each of the first and second sleeves 131, 132 is less than or equal to half of the thickness of the first keyboard section 11 and the second keyboard section 12.

In other embodiments, each of the first sleeve 131 and the second sleeve 132 may be halved into two portions. One portion of the first sleeve 131 is received in the first notch 112 defined on the sidewall 111 of the first keyboard section 11, and another portion is received in the second notch 121 defined on the sidewall 122 of the second keyboard section 12. One portion of the second sleeve 132 is received in the second notch 121, and another portion is received in the first notch 112. Thus, the first keyboard section 11 can be seamlessly connected with the second keyboard section 12. Particularly, the portable keyboard 1 may be integrated into an electronic device, for example, a portable computer, or a laptop computer. That is, the portable keyboard 1 forms a portion of the electronic device.

Although numerous characteristics and advantages of the present embodiments have been set out in the foregoing description, together with details of the structures and functions of the embodiments, the disclosure is illustrative only; and changes may be made in detail, especially in the matters of shape, size and arrangement of parts within the principles of the disclosure to the full extent indicated by the broad general meaning of the terms in which the appended claims are expressed.

What is claimed is:

1. A portable keyboard capable of being folded, the keyboard comprising:
   a first keyboard section having a first sidewall and a second keyboard section having a second sidewall, the first keyboard section and the second keyboard section being coplanar with each other when the portable keyboard is unfolded, and overlapping each other when the portable keyboards is folded; and
   a folding structure and an electrical connection member arranged between the first keyboard section and the second keyboard section, the electrical connection member being configured for electrically connecting the first keyboard section and the second keyboard section, the folding structure being configured for fixing the second keyboard section to the first keyboard section when the portable keyboard is unfolded, and rotating the first keyboard section and the second keyboard section relative to each other therearound when the portable keyboard is needed to be folded from the unfolded state;
   wherein the folding structure comprises a rotary assembly having a first sleeve, a second sleeve, and a pivot, the first sleeve is located at the first sidewall, the second sleeve is located at the second sidewall, the pivot is sleeved by the first sleeve and the second sleeve and is capable of moving within the first sleeve and the second sleeve, and the first sleeve and the second sleeve are capable of rotating relative to each other about the pivot until the first keyboard section overlaps the second keyboard section;
   wherein the first sidewall comprises a first notch and the second sidewall comprises a second notch, the first notch and the second notch resist with each other jointly forming a receiving space to receive the first sleeve and the second sleeve; the first sleeve and the second sleeve are hollow and communicate with each other to form a latching space, and the pivot is movably latched into the latching space, when the portable keyboard is unfolded.

2. The portable keyboard according to claim 1, wherein the pivot includes a body, and a first resisting member and a second resisting member defined at two opposite ends of the body correspondingly, and each of the first sleeve and the second sleeve comprises a limiting member configured for limiting the position of the first resisting member and the second resisting member.

3. The portable keyboard according to claim 2, wherein the second sleeve slides downward along the pivot until the limiting member of the first sleeve resists the first resisting member and the limiting member of the second sleeve resists the second resisting member, to make the first keyboard section and the second keyboard section capable of rotating relative to each other about the pivot, when the portable keyboard is being folded.

4. The portable keyboard according to claim 2, wherein the first resisting member and the second resisting member are protrusions which extend from a surface of the body to external sides of the pivot, and the limiting members of the first sleeve and the second sleeve are resisting walls extending from an inner wall of the first sleeve and an inner wall of the second sleeve.

5. The portable keyboard according to claim 1, wherein the first sleeve and the second sleeve contact and overlap each other, and the first notch and the second notch jointly form a hollow cylindrical space to receive the first sleeve and the second sleeve therein when the portable keyboard is unfolded.

6. The portable keyboard according to claim 1, wherein the first keyboard section comprises a first shell having the first sidewall, the second keyboard section comprises a second shell having the second sidewall, the first sidewall defines an opening, the second sidewall defines a fixing portion, the folding structure comprises an urging structure fixed and received in the first shell, and the urging structure comprises a first terminal capable of being forced to extend out from the first shell through the opening and being received by the fixing portion to fix the second keyboard section to the first keyboard section when the portable keyboard is unfolded.

7. The portable keyboard according to claim 6, wherein the urging structure comprises a resisting portion and a driving portion, the resisting portion is fixed into the first shell, the driving portion comprises a drive button, a slide rod, and a pushing element, the drive button connects to the pushing element, and the pushing element sleeves on the slide rod and is driven by the drive button.

8. The portable keyboard according to claim 7, wherein the urging structure further comprises a second terminal, the pushing element comprises a first wedge-shaped portion, the resisting portion comprises a first rod, at least one second rod, at least one spring, and a second wedge-shaped portion contacted with the first wedge-shaped portion, the first terminal is connected at one end of the at least one second rod, the second terminal is connected to one end of the first rod opposite to the first terminal, the at least one spring is sleeved on the at least one second rod between the first terminal and the second terminal, when the drive button is forced to move by an external force, the first wedge-shaped portion pushes the second wedge-shaped portion to draw the first terminal into the first shell, and the at least one spring is pressed by the pushing element to deform.

9. The portable keyboard according to claim 8, wherein the at least one spring drives the first terminal to move out of the first shell through the opening, when the external force applied on the drive button is eliminated.

10. The portable keyboard according to claim 1, wherein the first sidewall defines at least one first latch member and the second sidewall defines at least one second latch member coupled to the at least one first latch member, and the at least one first latch member and the at least one second latch member are configured for fixing the second keyboard section to the first keyboard section.

11. The portable keyboard according to claim 10, wherein the at least one first latch member is a T-shaped protrusion and the at least one second latch member is a T-shaped recess for receiving the at least one first latch member.

12. The portable keyboard according to claim 7, wherein the first shell further comprises a top surface, the top surface defines a through hole, and the drive button protrudes out from the first shell through the through hole and is capable of being forced to move along the through hole.

13. The portable keyboard according to claim 6, wherein the first terminal is triangular prism shaped, and the fixing portion of the second keyboard section is a triangular prism shaped groove configured for receiving the first terminal.

14. The portable keyboard according to claim 1, further comprising: a third keyboard section adjacent to the first keyboard section, and the first keyboard section and the third keyboard section are coplanar with each other when the portable keyboards is unfolded, or overlap each other when the portable keyboards is folded.

15. The portable keyboard according to claim 14, wherein the first keyboard section is sandwiched between the second keyboard section and the third keyboard section when the portable keyboard is folded.

16. A portable keyboard capable of being folded, the keyboard comprising:
a first keyboard section having a first sidewall and a second keyboard section having a second sidewall adjacent to the first sidewall; and
a folding structure arranged between the first keyboard section and the second keyboard section and configured to fix the second keyboard section to the first keyboard section;
wherein the folding structure comprises a rotary assembly having a first sleeve, a second sleeve, and a pivot; the first sidewall comprises a first notch and the second sidewall comprises a second notch, the first notch and the second notch jointly form a receiving space to receiving the first sleeve and the second sleeve; the first sleeve and the second sleeve are hollow and communicate with each other to form a latching space, and the pivot is movably latched into the latching space.

17. The portable keyboard according to claim 16, wherein the first notch and the second notch jointly form a hollow cylindrical space to receive the first sleeve and the second sleeve therein, and the first sleeve and the second sleeve contact and overlap each other when the first sleeve and the second sleeve are received in the hollow cylindrical space.

* * * * *